US008425167B2

(12) United States Patent
Miura

(10) Patent No.: US 8,425,167 B2
(45) Date of Patent: Apr. 23, 2013

(54) FASTENER ASSEMBLY FOR FASTENING A MEMBER TO WORKPIECE

(75) Inventor: Daisuke Miura, Toyohashi (JP)

(73) Assignee: Newfrey LLC, Newark, DE (US)

( * ) Notice: Subject to any disclaimer, the term of this patent is extended or adjusted under 35 U.S.C. 154(b) by 308 days.

(21) Appl. No.: 12/853,805

(22) Filed: Aug. 10, 2010

(65) Prior Publication Data

US 2011/0033260 A1    Feb. 10, 2011

(30) Foreign Application Priority Data

Aug. 10, 2009 (JP) .................................. 2009-185789

(51) Int. Cl.
*F16B 13/04* (2006.01)

(52) U.S. Cl.
USPC ................................ 411/54; 411/55; 411/171

(58) Field of Classification Search .................. 411/171, 411/15, 45, 54, 55, 340, 344
See application file for complete search history.

(56) References Cited

U.S. PATENT DOCUMENTS

| 2,392,491 | A | * | 1/1946 | Moran | 411/54 |
| 2,403,330 | A | * | 7/1946 | Benton | 411/54 |
| 2,958,070 | A | * | 10/1960 | Brewer et al. | 439/807 |
| 4,834,601 | A | * | 5/1989 | Schaap | 411/340 |
| 5,054,980 | A | * | 10/1991 | Bidefeld | 411/171 |
| 5,275,519 | A | * | 1/1994 | Hainke et al. | 411/55 |
| 6,818,851 | B2 | | 11/2004 | Ramasamy et al. | |
| 2008/0181745 | A1 | | 7/2008 | Naik et al. | |

FOREIGN PATENT DOCUMENTS

| DE | 8623171 U | 11/1986 |
| DE | 9312678 U | 12/1993 |
| JP | 63-13911 A | 1/1988 |
| JP | 10-129371 A | 5/1998 |
| JP | 2006-502359 T | 1/2006 |
| JP | 2006-044308 A | 2/2006 |

* cited by examiner

*Primary Examiner* — Flemming Saether
(74) *Attorney, Agent, or Firm* — Michael P. Leary

(57) ABSTRACT

A fastener assembly comprises a stud bolt including a bolt portion and a weld end to be welded to a workpiece, and a nut member to be screwed into the stud bolt. The nut member screwed into the stud bolt before welding is formed out of an electrically conductive material to allow the welding current to flow through the nut member into the stud bolt and weld the nut member to the workpiece while connected to the stud bolt. Then an attachment member is disposed on top of the workpiece, and the attachment member is fastened to the workpiece when the nut member is turned in the fastening direction.

3 Claims, 3 Drawing Sheets

(A)             (B)

FASTENER ASSEMBLY FOR FASTENING A MEMBER TO WORKPIECE

CROSS REFERENCE TO RELATED APPLICATIONS

This application claims the benefit of Japanese Application No. 2009-185789, filed Aug. 10, 2009, the disclosure of which is incorporated herein by reference.

BACKGROUND OF THE INVENTION

The present invention relates to a fastener assembly comprising a stud bolt to be welded to a workpiece to be welded, and a nut member to be screwed into the stud bolt, in which the attachment member is fastened to the workpiece when the nut member is turned in the fastening direction with the stud bolt screwed in.

Patent Document 1 describes a fastener assembly comprising a stud bolt to be welded to a workpiece to be welded, and a nut member to be screwed into the stud bolt, in which the attachment member is fastened to the workpiece to be welded when the nut member is turned in the fastening direction with the stud bolt screwed in (Japanese Published Unexamined Patent Application No. 63-013911).

As is well known, an automobile bumper is mounted on a car body using reinforcement (a reinforcing member). Mounting the reinforcement on the car body easily and in a short amount of time is preferred. However, there is a lot of assembly of pre-assembled components using tools in order to reliably position the components in a narrow space. As a result, there is room for improvement in terms of workability.

Reference documents include:
[Patent Document 1] Japanese Published Unexamined Patent Application No. 63-013911
[Patent Document 2] Japanese Published Unexamined Patent Application No. 10-129371
[Patent Document 3] Japanese Published Unexamined Patent Application No. 2006-044308
[Patent Document 4] Japanese Published Unexamined Patent Application No. 2006-502359

BRIEF DESCRIPTION OF THE INVENTION

As mentioned above, Patent Document 1 describes a fastener assembly able to fasten an attachment member to a workpiece by fastening a stud bolt to the workpiece to be welded by a nut member screwed into the stud bolt. Because the nut member in this fastener assembly is formed using a plastic material, the nut member has to be separate from the stud bolt when the stud bolt is welded to the workpiece. Because the nut member is screwed into the stud bolt after the stud bolt has been welded to the workpiece, it takes time and effort to attach the reinforcement used to mount a bumper on a car body in a narrow space.

An attachment structure for the reinforcement on the bumper is described in Patent Document 2. In this structure, the reinforcement can return to its original position after becoming elastically deformed. It is not a structure that improves the reinforcement attachment operation. Another bumper beam assembly (bumper reinforcement) attachment structure is described in Patent Document 3. This structure is provisionally attached to the car body using a bolt, and this bolt is slidingly received by a large diameter hole in the bumper beam assembly. After several additional steps, the bolt is secured with a nut. This structure can be painted with the bumper beam attached. This makes it easier to apply the sealant after painting. However, it is not a structure that improves the reinforcement attachment operation. Patent Document 4 describes a stud bolt having a bolt portion in which male threading has been formed and having a weld end to be welded to a workpiece. The stud bolt in Patent Document 4 is a round stud in which a round recess is formed in the center of the welded surface at the weld end so that only the ring-like outer edge is welded. Patent Document 4 does not describe bumper reinforcement attached to a car body and does not describe a structure that improves the reinforcement attachment operation.

The object of the present invention is to provide a fastener assembly comprising a stud bolt and a nut member for easily fastening an attachment member to a workpiece in a short time with high workability even in a narrow space.

In order to achieve this object, the present invention is a fastener assembly comprising a stud bolt having a bolt portion formed with male threading and a weld end to be welded to a workpiece, and a nut member having female threading to be screwed into the bolt portion of the stud bolt, the attachment member being fastened to the workpiece when the stud bolt welded to the workpiece is inserted into the attachment hole of the attachment member and screwed into the nut member, the fastener assembly characterized in that the nut member is screwed into the bolt portion of the stud bolt before being welded to the workpiece and the nut member is formed out of an electrically conductive material to allow the welding current to flow into the stud bolt and weld the fastener assembly to the workpiece while the nut is connected to the stud bolt.

Furthermore, the attachment member is disposed on top of the workpiece whose weld end is welded to the stud bolt connected beforehand to the nut member, and the attachment member is fastened to the workpiece when the nut member is turned in the fastening direction.

As a result, the nut member can be welded to the workpiece to be welded with the stud bolt already assembled. The nut member does not have to be screwed in after welding in a narrow space. Because the operation only involves turning the nut member in the fastening direction, an attachment member such as reinforcement can be easily attached to a workpiece such as a car body in a short period of time and with high workability.

In this fastener assembly, the outer diameter of the nut member is greater than the diameter of the shaft portion of the stud bolt between the end portion of the nut member and the weld end, a keyhole-shaped attachment hole is formed in the attachment member comprising a first hole with a diameter larger than the outer diameter of the nut member, and a second hole with a diameter greater than the shaft portion of the stud bolt but smaller than the outer diameter of the nut member, and the attachment member receives the nut member and the stud bolt in the first hole of the attachment hole and is disposed on top of the workpiece, and then slidingly disposed to receive the shaft portion of the stud bolt in the second hole of the attachment hole, thereby disposing the attachment member between the workpiece and the nut member. Because the smaller diameter second hole in the attachment hole accurately determines the position of the attachment member, positioning the attachment member is easier and more precise. This allows an attachment member such as reinforcement to be accurately attached to a workpiece such as a car body in a short period of time.

In this fastener assembly, a plurality of pressing pieces extending towards the weld end of the stud bolt is installed at intervals around the outer periphery of the stud bolt in the nut member, and the tips of the pressing pieces widen outward in the radial direction and press on the attachment member as the nut member is rotated in the fastening direction. The plurality of pressing pieces act as guides when the bolt is inserted into the attachment hole in an attachment member such as reinforcement in order to position the attachment member precisely and easily. The pressing pieces strengthen the force of the nut member bearing down on the attachment member, and the uniform widening of the pressing pieces applies equal pressure on the attachment member to apply pressure more securely. A threadless rod-shaped portion is formed in the stud bolt between the weld end and the bolt portion, a tapered large diameter portion is formed in the rod-shaped portion to widen the pressing pieces of the nut member outward in the radial direction when the nut member is rotated in the fastening direction, and a neck portion in which the attachment member is disposed is formed between the large diameter portion and the weld end. In this way, the pressing pieces act to apply pressure at equal intervals around the outer periphery of the attachment member, and the attachment portion is supported with uniform strength. The nut member with the stud bolt screwed in beforehand is connected with the tips of the pressing pieces contacting the large diameter portion of the rod-shaped portion of the stud bolt but not yet widened outward in the radial direction.

In one example of the fastener assembly, the fastener assembly has a tubular main body with a polygonal outer peripheral surface such as a hexagonal outer peripheral surface, a head portion at one end of the tubular main body for blocking the end portion of the bolt portion of the stud bolt, and a large diameter seat portion at the other end of the tubular main body for stabilizing the attachment member in the workpiece and for pushing down. In one example of the fastener assembly, the attachment member is reinforcement (a reinforcing member) for an automobile bumper.

DETAILED DESCRIPTION OF A PREFERRED EMBODIMENT

Figure 1:
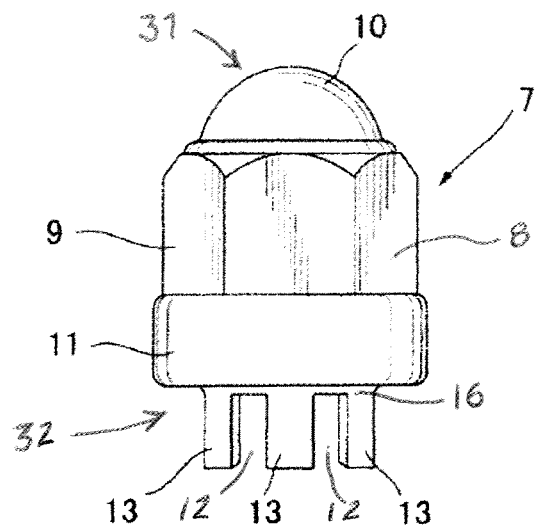
FIG. 1 A front view of the nut member isolated from the fastener assembly in an embodiment of the present invention.
Figure 2:
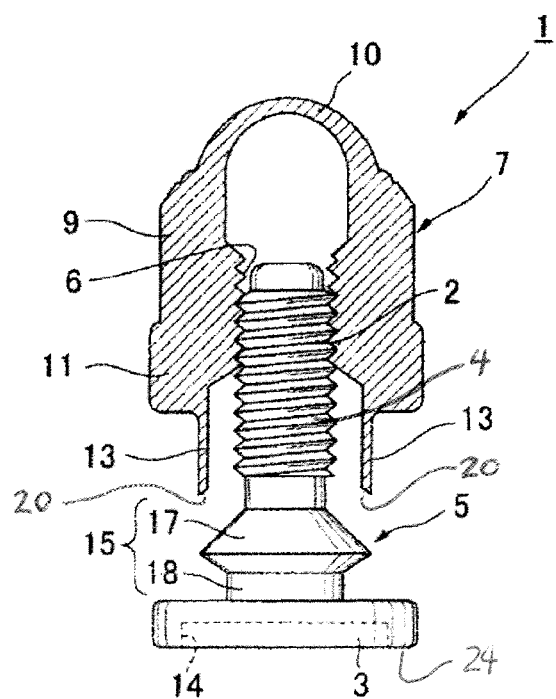
FIG. 2 A partially cutaway front view of the nut member in FIG. 1, part of which is shown in cross-section, while being assembled with the stud bolt in the fastener assembly in the embodiment of the present invention.
Figure 3:
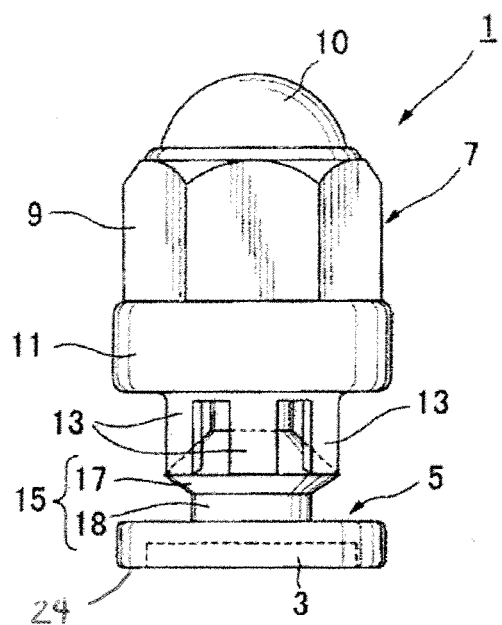
FIG. 3 A front view of the nut member coupled with the stud bolt beforehand in the fastener assembly in the embodiment of the present invention.

The following is an explanation of the fastener assembly in an embodiment of the present invention with reference to the figures. As shown in FIG. 1 through FIG. 3, the fastener assembly 1 comprises a stud bolt 5 having a bolt portion 2 in which male threading 4 has been formed and a weld end 3 welded to the workpiece to be welded (the first workpiece), and a nut member 7 having female threading 6 to be screwed into the bolt portion 2 of the stud bolt 5. In FIG. 1, the nut member 7 is shown in isolation. The nut member 7, as shown in FIG. 2 and FIG. 3, is screwed into the bolt portion 2 of the stud bolt 5 before being welded to the workpiece. The nut member 7 is also formed from an electrically conductive material allowing the welding current to flow to the stud bolt 5 and the fastener assembly 1 to be welded to the workpiece with the nut member 7 screwed into the stud bolt 5. FIG. 2 shows the nut member 7 being screwed into the stud bolt 5, and FIG. 3 shows the nut member 7 screwed into the stud bolt 5. The fastener assembly 1 is shipped to the user in the manner shown in FIG. 3 and is handled as a single product.

Figure 5:
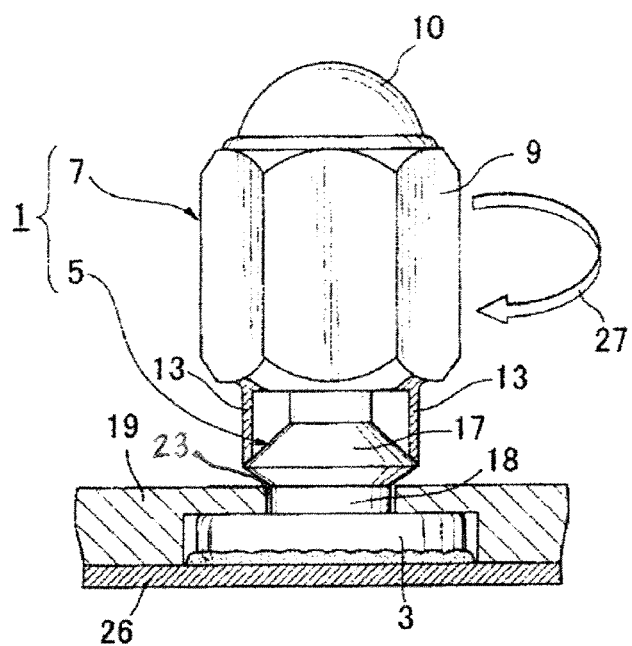
FIG. 5 A partially cutaway front view of the fastener assembly showing the nut member of the fastener assembly being turned in the fastening direction to secure the attachment member to the workpiece with the fastener assembly in the embodiment of the present invention welded to the workpiece.
Figure 6:
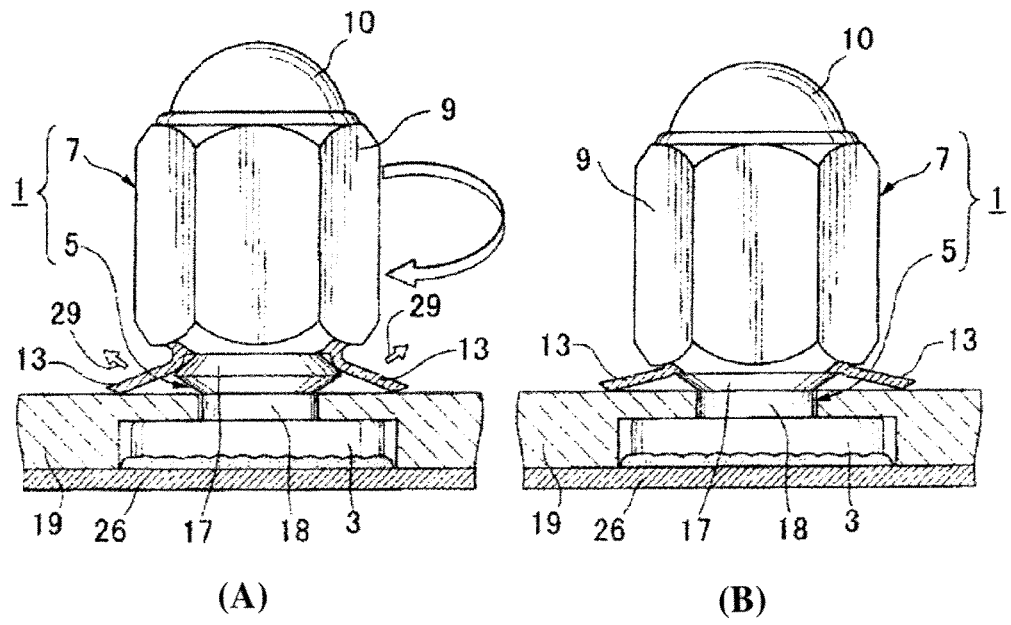
FIG. 6 A diagram showing the fastener assembly in the embodiment of the present invention securing the attachment member to the workpiece by turning the nut member further in the fastening direction from the position shown in FIG. 5, in which (A) is a partially cutaway front view of the fastener assembly while the nut member is being secured, and (B) is a partially cutaway front view of the fastener assembly after the nut member has been secured.

The following is a detailed explanation of the configuration of the nut member 7 with reference to FIG. 1. The nut member 7 is formed from an electrically conductive material such as a metal or from an electrically conductive resin material so that the welding current is allowed to flow into the stud bolt 5. The nut member 7 has a tubular main body 9 with a polygonal outer peripheral surface 8 such as a hexagonal outer peripheral surface, a head portion 10 at a first upper end 31 of the tubular main body 9 for blocking the end portion (the upper end portion in FIG. 2 and FIG. 3) of the bolt portion 2 of the stud bolt 5, and a large diameter seat portion 11 at a second lower end 32 of the tubular main body 9 for stabilizing the attachment member in the workpiece and for pushing down. The seat portion 11 is not essential and can be eliminated as shown in FIG. 5 and FIG. 6. Female threading 6 is formed on the inside of the tubular main body 9 of the nut member 7 for screwing in the bolt portion 2 of the stud bolt 5. The outer diameter of the tubular main body 9 and the seat portion 11 is larger than the diameter of the shaft portion of the bolt portion 2 of the stud bolt 5.

In the nut member 7, a plurality of pressing pieces 13 extending toward the weld end portion 3 of the stud bolt 5 are arranged around the outer periphery of the stud bolt 5. In the embodiment shown in FIG. 1, six axial slits 12 are formed in the thin tubular portion 16 integrally extending from the seat portion 11 in a tube shape. This forms six pressing pieces 13 at equal intervals around the outer periphery of the stud bolt 5. As shown in FIG. 2 and FIG. 3, pressing pieces 13 extend straight downward from the seat portion 11, and are flexible enough so that the tips 20 gradually splay and widen outward in the radial direction along the taper in the large diameter portion 17 when the nut member 7 is turned in the fastening direction 27 and makes contact with the tapered large diameter portion 17 of the stud bolt 5. In the fastener assembly 1, the plurality of pressing pieces 13 are arranged at equal intervals around the outer periphery of the stud bolt 5. As a result, the pressing pieces 13 act as guides around the stud bolt 5 after the fastener assembly 1 has been inserted into an attachment hole 21 in an attachment member 19 (the second workpiece) such as reinforcement. This easily and accurately positions the attachment member 19 relative to the fastener assembly 1, which is already welded to the workpiece 26.

When the nut member 7 is turned around the stud bolt 5 in the fastening direction 27 to fasten the attachment member 19 to the workpiece 26, the tips 20 of the pressing pieces 13 widen outward in the radial direction 29 with the rotation and apply pressure to the attachment member 19. Because the force applied by the nut member 7 to the attachment member 19 is added to the pressure from the seat portion 11, the fastening is more secure. When the nut member 7 is screwed in, the plurality of pressing pieces 13 engages the outer periphery of conical tapered large diameter portion 17 of the stud bolt 5 at equal intervals. The seat portion 11 of the nut member 7 makes contact with the attachment member 19 at equal intervals, and the attachment strength remains high.

As mentioned above, the stud bolt 5 has a bolt portion 2 in which male threading 4 has been formed and a weld end 3 to be welded to the workpiece 26. The weld end 3 is fastened to the workpiece 26 such as a car body using welding. The stud bolt 5 is formed out of an electrically conductive material so that the welding current flows through it into the workpiece 26. The annular welded surface 24 of the weld end 3, as indicated by the dotted lines in FIG. 2, define a round recess 14 in the central portion of the weld face so that only the ring-shaped outer edge 24 is welded (forming a so-called round stud). This shape allows the molten portion of the weld end 3 and the workpiece 26 to escape into the round recess 14, allowing for smooth and reliable welding.

A threadless rod-shaped portion 15 is formed in the stud bolt 5 between the weld end 3 and the bolt portion 2, and a conical tapered large diameter portion 17 is formed in the rod-shaped portion 15 so that the pressing pieces 13 in the nut member 7 are splayed and widened outward in the radial direction 29 and their diameter increased towards the weld end 3 when the nut member 7 is turned in the fastening direction 27. A small diameter neck portion 18 is formed between the large diameter portion 17 and the weld end 3. This neck portion 18 is large enough to fit snugly into the small diameter second hole 23 in the attachment hole 21 of the attachment member 19. The conical tapered large diameter portion 17 acts to allow the plurality of pressing pieces 13 to apply pressure at equal intervals around the attachment member 19, thus supporting the attachment member 19 with uniform strength. The neck portion 18 acts to reliably secure the attachment member 19.

As shown in FIG. 3, the nut member 7 is screwed into the stud bolt 5 and secured. More specifically, the nut member 7 is screwed into the stud bolt 5 and secured with the tips 20 of the pressing pieces 13 making contact with the large diameter portion 17 of the rod-shaped portion 15 of the stud bolt 5 immediately before widening outward in the radial direction. When secured as shown in FIG. 3, the assembly is treated as a single product and shipped to the user.

Figure 4:
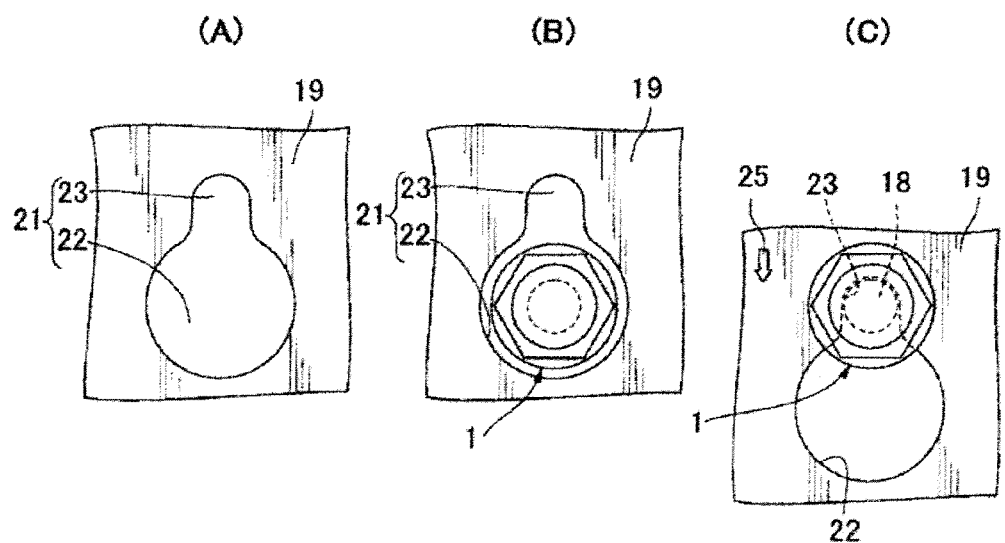
FIG. 4 A diagram showing the relationship between the attachment hole in the attachment member and the fastener assembly in the embodiment of the present invention, in which (A) is a top view of the attachment hole in the attachment member, (B) is a top view of the attachment hole positioned and received in the attachment assembly, and (C) is a top view of the attachment member slid so as to receive the fastener assembly in the second hole of the attachment hole.

FIG. 4 shows the relationship between the fastener assembly 1 and the attachment hole 21 in the attachment member 19. As shown in FIG. 4 (A), the attachment hole 21 in the attachment member 19 is a keyhole-shaped attachment hole comprising a first hole 22 with a diameter larger than the outer diameter of the nut member 7, and a second hole 23 with a diameter greater than the neck portion 18 of the rod-shaped portion 15 serving as the shaft portion of the stud bolt 5 but smaller than the outer diameter of the nut member 7. As shown in FIGS. 4 (B) and (C), after introducing the nut member 7 and the stud bolt 5 into the first hole 22 of the attachment hole 21 and disposing the attachment member 19 on top of the workpiece 26 [FIG. 4 (B)], the attachment member 19 is slid laterally in direction of arrow 25 so that the neck portion 18 in the shaft portion of the stud bolt 7 is received into the small diameter second hole 23 [FIG. 4 (C)], and the attachment member 19 is disposed between the workpiece 26 and the nut member 7.

Because the small diameter second hole 23 in the attachment hole 21 accurately positions the attachment member 19, the attachment member 19 is positioned easily and accurately. In other words, an attachment member 19 such as reinforcement can be accurately assembled with a workpiece 26 such as a car body in a short period of time.

The following is an explanation with reference to FIG. 5 and FIG. 6 of an operation in which a fastener assembly 1 with this configuration is fastened at a predetermined position on the workpiece 26 such as a car body (the first workpiece), and the attachment member 19 such as bumper reinforcement for an automobile (the second workpiece) is attached to the workpiece 26. The seat portion 11 shown in FIG. 1 through FIG. 3 is not present on the nut member 7 in the fastener assembly 1 of FIG. 5 and FIG. 6. A seat portion 11 is not required, and it does not change the basic function of the fastener assembly 1.

First, a nut member 7 made of an electrically conductive material is screwed into a stud bolt 5 to obtain a fastener assembly 1. Then the weld end 3 of the stud bolt 5 on the fastener assembly 1 is welded at a predetermined position on the workpiece 26 using a welding seal with the tubular main body 9 of the nut member 7 held in place. Next, the nut member 7 of the fastener assembly 1 is passed through the large diameter first hole 22 in the attachment hole 21 of the attachment member 19 [see FIG. 4 (B)], and then the attachment member 19 is slidingly disposed in the direction of arrow 25 so that the neck portion 18 of the stud bolt 7 is received into the small diameter second hole 23 [FIG. 4 (C)]. As shown in FIG. 5, the attachment member 19 is disposed in a predetermined position on top of the workpiece 26. Because the small diameter second hole 23 in the attachment hole 21 accurately positions the attachment member 19, the attachment member 19 is easily and accurately positioned relative to the workpiece 26. In other words, an attachment member 19 such as reinforcement can be accurately assembled on a workpiece 26 such as a car body in a short period of time. Because the plurality of pressing pieces 13 are arranged at equal intervals around the outer periphery of the stud bolt 5, the pressing pieces 13 act as guides around the stud bolt 5 after the fastener assembly 1 has been inserted into the attachment hole 21 in the attachment member 19. This easily and accurately positions the attachment member 19 relative to the fastener assembly 1 and workpiece 26.

Next, the nut member 7 is turned using a wrench in the fastening direction indicated by arrow 27 in FIG. 5. When the nut member 7 is turned in the fastening direction 27, as shown in FIG. 6 (A), the nut member 7 is lowered along the threading 4 in the bolt portion 2 of the stud bolt 5, and the lower end 23 (the seat portion 11 in the example shown in FIG. 1 through FIG. 3) of the nut member 7 presses the attachment member 19 against the workpiece 26 and the attachment member 19 is fastened to the workpiece 26. When the nut member 7 is turned in the fastening direction 27, the plurality of pressing pieces 13 makes contact with the tapered large diameter portion 17 of the stud bolt 5, and the tips 20 are gradually bent along the tapering so as to widen outward in the radial direction [arrow 29 in FIG. 6 (A)]. The plurality of pressing pieces 13 act to apply pressure on the attachment member 19 at equal intervals around the outer periphery, and the attachment member 19 is supported by uniform strength. When the tightening of the nut member 7 has been completed, the attachment member 19 is fastened to the workpiece 26 by the fastening assembly 1 [see FIG. 6 (B)]. The lower end 32 (or seat portion 11) of the nut member 7 pushes the attachment member 19 into the workpiece 26. Because the force of the pressing pieces 13 against the attachment member 19 adds to the pressing force at the lower end 32 of the nut member 7 (or the seat portion 11), the fastening is more secure. When the nut member 7 is screwed in, the plurality of pressing pieces 13 have moved while engaging the outer periphery of the stud bolt 5 at equal intervals. The seat portion 11 of the nut member 7 makes contact with the attachment member 19 at equal intervals, and the attachment strength remains high.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A fastener assembly adapted for welding to a first workpiece and then mechanically securing a second workpiece to the first workpiece, the fastener assembly comprising:
    a weld stud including:
        a bolt portion formed with a male threading,
        a weld end weldable to the first workpiece;
        a shank located between the bolt portion and the weld end;
        the shank including a conical surface tapering radially outward to a first diameter in the axial direction of the weld end;
        the shank further including a neck portion located between the conical surface and the weld end, and having a second diameter less than the first diameter; and
    a nut member including
        a tubular body further including an outer polygonal surface and an internal female thread;
        a plurality of pressing pieces having predetermined lengths located at intervals around an outer periphery of the nut member, the pressing pieces including tips, the tips being proximate to the weld end of the stud bolt;
    the nut member being tightened on the bolt portion, via the nut member internal female threads and the bolt portion male threading, against the second workpiece;
    wherein the pressing pieces contact the conical surface and are splayed radially outward and contact the second workpiece; and
    wherein the pressing pieces are deformed to tangentially engage the second workpiece such that substantially the entire lengths of the pressing pieces extend radially outward beyond the first diameter of the conical surface so that the second workpiece is supported by uniform compressive strength against the first workpiece.

2. A fastener assembly according to claim 1, wherein the weld end of the weld stud includes a flange, and the flange further includes an annular weld surface and defines a cylindrical recess within the flange.

3. A fastener assembly according to claim 1, wherein the nut member further includes:
    a head portion located at a first end of the tubular body for closing the tubular body, and
    a lower portion located at a second end of the tubular body adjacent to and above the upper axial end of the pressing pieces, at least part of the lower portion having an internal shape complementary to the conical surface of the weld shank, whereby
    the conical surface of the weld shank is disposed within the lower portion.

* * * * *